July 25, 1967     H. H. WIEDER ETAL     3,332,738
PROCESS FOR THE PREPARATION OF THE STRONTIUM
ISOMORPH OF COLEMANITE
Filed March 28, 1963

Sr ISOMORPH OF COLEMANITE

HARRY H. WIEDER
ARTHUR R. CLAWSON
CHARLES R. PARKERSON
*INVENTORS*

BY *J. M. St. Amand*

*ATTORNEY*

United States Patent Office 3,332,738
Patented July 25, 1967

3,332,738
PROCESS FOR THE PREPARATION OF THE STRONTIUM ISOMORPH OF COLEMANITE
Harry H. Wieder and Arthur R. Clawson, Riverside, and Charles R. Parkerson, Arlington, Calif., assignors to the United States of America as represented by the Secretary of the Navy
Filed Mar. 28, 1963, Ser. No. 268,845
2 Claims. (Cl. 23—59)

The invention herein described may be manufactured and used by or for the Government of the United States of America for governmental purposes without the payment of any royalties thereon or therefor.

The present invention relates to synthetic ferroelectric colemanite and more particularly to the strontium isomorph of colemanite.

Colemanite is a mineral calcium borate pentahydrate found in relative abundance in conjunction with other borate minerals. At temperatures generally below $-2°$ C. to $-7°$ C. crystalline colemanite becomes ferroelectric and remains ferrolectric at least to ($-180°$ C.). Colemanite is a mechanically, electrically and chemically stable ferroelectric material. It shows none of the polarization fatigue effects associated with barium titanate nor is it subject to deliquescence at temperatures below $+50°$ C. as some other water soluble ferroelectric materials. Mineral colemanite contains many impurities. It is difficult, therefore, to determine the dependence of the desirable electrical properties upon the impurity content of a crystal. For switching applications, it is desirable to keep the transition temperature, i.e., the Curie temperature, above $+25°$ C. in order that no refrigeration be required for a computer memory device employing colemanite crystals. For its use as a dielectric bolometer or pyroelectric detector, it is desirable to control the Curie point by additive impurities so that the maximum change in polarization with temperature should occur at some predetermined temperature. Therefore, mineral colemanite because of its inhomogeneity, is not suited for these aforementioned applications and that the synthesis of the pure compound is required. It is for this reason partial substitution of strontium for calcium in colemanite is desired, i.e., to vary the Curie temperature. The amount of strontium used will necessarily vary depending upon the Curie temperature desired.

It is an object of the invention therefore to provide synthetic crystalline, ferroelectric colemanite $$(2CaO \cdot 3B_2O_3 \cdot 5H_2O)$$

It is another object of the invention to provide the synthesis of colemanite with partial substitution of strontium for calcium.

It is a further object of the invention to provide for the synthesis of the strontium isomorph $$(2SrO \cdot 3B_2O_3 \cdot 5H_2O)$$

of colemanite which represents 100% replacement of calcium by strontium.

Other objects and many of the attendant advantages of this invention will become readily appreciated as the same becomes better understood by reference to the following detailed description when considered in connection with the accompanying drawings wherein.

Figure 1:
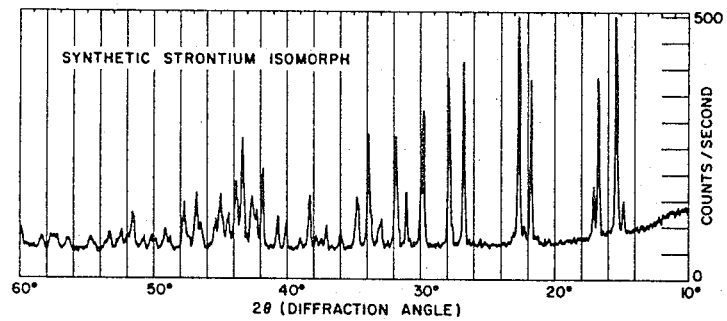
FIG. 1 shows an X-ray diffraction powder pattern of strontium isomorph of colemanite.

The publication, "Ferroelectric and Pyroelectric Properties of Mineral and Synthetic Colemanite," by H. H. Wieder, A. R. Clawson and C. R. Parkerson, Journal of Applied Physics, 33, 1720 (1962), describes in detail the results obtained on synthetic colemanite and compares the dielectric and pyroelectric properties of the synthetic compound with the impure mineral.

Colemanite may be synthesized by a two step reaction. The first step consists of the synthesis of inyoite $$(2CaO \cdot 3B_2O_3 \cdot 13H_2O)$$

synthetic $(2CaO \cdot 3B_2O_3 \cdot 9H_2O)$, or meyerhofferite $$(2CaO \cdot 3B_2O_3 \cdot 7H_2O)$$

For these reactions see Reactions 1, 2, and 3 of the Table of Reactions which follows. These higher hydrates may be converted to colemanite $(2CaO \cdot 3B_2O_3 \cdot 5H_2O)$ by reaction with borax solution. For an example of this conversion reaction see Reaction No. 4. Colemanite can also be synthesized by the preparation of gowerite $$(CaO \cdot 3B_2O_3 \cdot 5H_2O)$$

or nobleite $(CaO \cdot 3B_2O_3 \cdot 4H_2O)$ as given in Reactions 5 and 7. Reaction of either of these two compounds with borax solution as given in Reactions 6 and 8 will produce colemanite.

TABLE OF REACTIONS

| Reaction No. | Reactant I | | Reactant II | | Water Amount (grams) |
|---|---|---|---|---|---|
| | Chemical Formula | Weight (grams) | Chemical Formula | Weight (grams) | |
| 1 | $Na_2B_4O_7 \cdot 10H_2O$ | 1.67 | $Ca(IO_3)_2$ | 1.94 | 100 |
| 2 | $Na_2B_4O_7 \cdot 10H_2O$ | 1.67 | $Ca(IO_3)_2$ | 1.94 | 100 |
| 3 | $(NH_4)_2B_{10}O_{16} \cdot 8H_2O$ | 1.00 | $CaCl_2$ | 0.43 | 100 |
| 4 | $Na_2B_4O_7 \cdot 10H_2O$ | 1.71 | $2CaO \cdot 3B_2O_3 \cdot 7H_2$ (—200 Mesh) | 1.00 | 100 |
| 5 | $H_3BO_3$ | 40.0 | $Ca(C_2H_3O_2)_2$ | 20.0 | 100 |
| 6 | $Na_2B_4O_7 \cdot 10H_2O$ | 2.24 | $CaO \cdot 3B_2O_3 \cdot 5H_2O$ (Gowerite) | 1.25 | 150 |
| 7 | $H_3BO_3$ | 5.29 | $2CaO \cdot 3B_2O_3 \cdot 7H_2O$ | 1.85 | 100 |
| 8 | $Na_2B_4O_7 \cdot 10H_2O$ | 2.24 | $CaO \cdot 3B_2O_3 \cdot 4H_2O$ (Nobleite) | 1.25 | 150 |
| 9 | $(NH_4)_2B_{10}O_{16} \cdot 8H_2O$ | 16.0 | $Sr(NO_3)_2$ | 7.10 | 800 |
| 10 | $Na_2B_4O_7 \cdot 10H_2O$ | 2.24 | $SrO \cdot 3B_2O_3 \cdot 4H_2O$ | 1.25 | 150 |
| 11 | $Na_2B_4O_7 \cdot 10H_2O$ | 7.60 | $Sr(NO_3)_2$ | 4.20 | 200 |
| 12 | $Na_2B_4O_7 \cdot 10H_2O$ | 4.50 | $SrO \cdot B_2O_3 \cdot 4H_2O$ (Compound VI) | 1.50 | 150 |
| 13 | $H_3BO_3$ | 3.00 | $SrO \cdot B_2O_3 \cdot 4H_2O$ (Compound VI) | 1.50 | 150 |
| 14 | $Na_2B_4O_7 \cdot 10H_2O$ | 2.24 | $SrO \cdot 3B_2O_3 \cdot 4H_2O$ (Compound IV) | 1.25 | 150 |
| 15 | $Na_2B_4O_7 \cdot 10H_2O$ | 4.02 | $Sr(IO_3)_2 \cdot H_2O$ | 2.55 | 150 |
| 16 | $Na_2B_4O_7 \cdot 10H_2O$ | 2.24 | $SrO \cdot B_2O_3 \cdot 4H_2O$ (Compound V) | 1.25 | 150 |
| 17 | $Na_2B_4O_7 \cdot 10H_2O$ | 4.02 | $Sr(IO_3)_2 \cdot H_2O$ | 2.55 | 150 |
| 18 | $Na_2B_4O_7 \cdot 10H_2O$ | 11.44 | $SrCl_2 \cdot 6H_2O$ | 8.00 | 200 |

TABLE OF REACTIONS—Continued

| Reaction No. | Reactant III or Seed Material (if required) Chemical Formula | Reactant III or Seed Material (if required) Weight (grams) | Time (days) | Temperature, °C. | Product |
|---|---|---|---|---|---|
| 1 | | | 34 | 30 | Inyoite ($2CaO \cdot 3B_2O_3 \cdot 13H_2O$). |
| 2 | | | 5 | 65 | Meyerhofferite ($2CaO \cdot 3B_2O_3 \cdot 7H_2O$). |
| 3 | | | 41 | 30 | Synthetic ($2CaO \cdot 3B_2O_3 \cdot 9H_2O$). |
| 4 | $2CaO \cdot 3B_2O_3 \cdot 5H_2O$ (−200 Mesh) | 0.10 | 35 | 65 | Colemanite ($2CaO \cdot 3B_2O_3 \cdot 5H_2O$). |
| 5 | | | 1 | 35 | Gowerite ($CaO \cdot 3B_2O_3 \cdot 5H_2O$). |
| 6 | $2CaO \cdot 3B_2O_3 \cdot 5H_2O$ (−200 Mesh) | 0.10 | 15 | 65 | Colemanite ($2CaO \cdot 3B_2O_3 \cdot 5H_2O$). |
| 7 | | | 8 | 85 | Nobleite ($CaO \cdot 3B_2O_3 \cdot 4H_2O$). |
| 8 | $2CaO \cdot 3B_2O_3 \cdot 5H_2O$ (−200 Mesh) | 0.10 | 19 | 65 | Colemanite ($2CaO \cdot 3B_2O_3 \cdot 5H_2O$). |
| 9 | | | 7 | 25 | Compound III ($SrO \cdot 3B_2O_3 \cdot 5H_2O$). |
| 10 | | | 13 | 65 | Compound I ($2SrO \cdot 3B_2O_3 \cdot 5H_2O$). |
| 11 | NaOH | 3.2 | 7 | 25 | Compound VI ($SrO \cdot B_2O_3 \cdot 4H_2O$). |
| 12 | | | 27 | 65 | Compound I ($2SrO \cdot 3B_2O_3 \cdot 5H_2O$). |
| 13 | | | 13 | 65 | Compound IV ($SrO \cdot 3B_2O_3 \cdot 4H_2O$). |
| 14 | | | 8 | 65 | Compound I ($2SrO \cdot 3B_2O_3 \cdot 5H_2O$). |
| 15 | NaOH | 0.80 | 5 | 65 | Compound V ($SrO \cdot B_2O_3 \cdot 4H_2O$). |
| 16 | | | 27 | 65 | Compound I ($2SrO \cdot 3B_2O_3 \cdot 5H_2O$). |
| 17 | | | 14 | 65 | Do. |
| 18 | | | 36 | 80 | Do. |

It was suspected at an earlier date (H. H. Wieder, J. Appl. Phys. 30, 1010 (1959)) that the onset of ferroelectricity in colemanite may be strongly influenced by the presence of strontium replacing calcium substitutionally in the crystal-lattice of colemanite.

Partial substitutes of strontium for calcium in colemanite is achieved by preparing the higher hydrate by the same process as reactions 1 thru 3 from the above Table of Reactions in the presence of the desired strontium ion impurity in the form of a highly ionized strontium compound such as $SrCl_2$, $Sr(NO_3)_2$, etc. or a partially ionized compound such as $Sr(IO_3)_2 \cdot H_2O$. The amount of strontium ion impurity added will vary as to the desired Curie temperature. By controlling the amount of strontium substituted in the crystal lattice of colemanite the Curie temperature of the product can be tailored to desired points between −35° C., which is the Curie temperature for synthetic colemanite, and +35° C., which is the Curie temperature for the strontium isomorph of colemanite. The amount of strontium ion impurity used will necessarily be determined by the Curie temperature desired. The higher hydrate is then converted to colemanite with borax solution as previously described. If a higher percentage of replacement is desired, strontium ion may be added to this conversion reaction also.

The discrepancies between various authors as to the exact Curie temperature of colemanite ranging between 0° C. and −7° C. were suspected as due primarily to the variable strontium content of colemanite, i.e. that mineral colemanite is thus a solid solution of calcium-strontium borate pentahydrate. It was proposed, therefore, to produce a synthetic colemanite containing a large amount of strontium instead of calcium. The method is outlined below:

The first step consisted of the preparation of a specimen as follows: (For example)

Reactants:
| | | |
|---|---|---|
| $H_2O$ | ml | 800 |
| Ammonium pentaborate | gm | 16.0 |
| $Sr(NO_3)_2 \cdot H_2O$ | gm | 7.10 |

The ammonium pentaborate was dissolved in 700 ml. $H_2O$ by heating to approximately 85° C. The $$Sr(NO_3)_2 \cdot H_2O$$

was dissolved in 100 ml. $H_2O$ at approximately 85° C. The 100 ml. of $Sr(NO_3)_2 \cdot H_2O$ solution was added to the 700 ml. of APB while hot, a few crystal seeds of synthetic meyerhofferite was added, and the container was sealed and allowed to cool to room temperature with continuous agitation. Continuous agitation was maintained for a period of three weeks. The reaction products were then used for preparing the strontium synthetic equivalent of colemanite by the following procedure and using the indicated constituents:

| | Grams |
|---|---|
| Borax | 2.24 |
| The specimen preparation described above | 1.25 |
| $H_2O$ | 150 |

Figure 2:
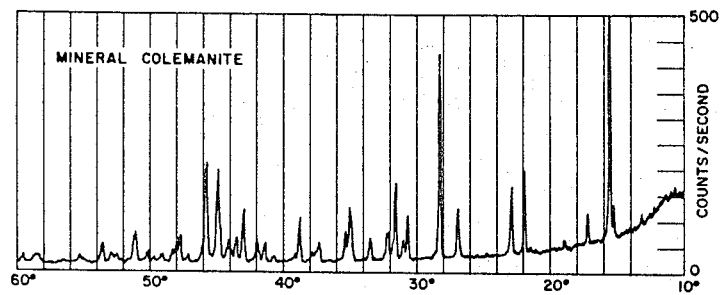
FIG. 2 shows the X-ray diffraction powder pattern of natural colemanite.

The above was heated and sealed at 70° C. and maintained at that temperature for 13 days with continuous agitation by means of a shaker table. A second sample was prepared in an identical manner except that the reaction was allowed to proceed for 35 days. The resultant crystallites are microscopic in size. The Debye-Sherer X-ray pattern, the dielectric properties and the pyroelectric properties were measured. The X-ray diffraction powder pattern of the strontium isomorph of colemanite is shown in FIG. 1. It may be compared with the powder pattern of natural colemanite shown in FIG. 2.

The X-ray powder diffraction pattern of the Sr isomorph bears a striking similarity to that of natural colemanite. The significant similarities are in the lines at the smaller angles. Since these are due to low order $<hkl>$ reflection there are fewer combinations of $h,k,l$ that can account for them. The similarity in the grouping of these lines indicates a very similar crystal lattice, especially since these lines occur at only slightly different angles. The change in position of the lines is due to slight changes in the interatomic distances in the lattice when Sr is substituted for Ca. The occurrence or extinction of one or two minor lines and the change in magnitude of the main reflections is also due to slight changes in position of the atoms in the lattice.

Figure 3:
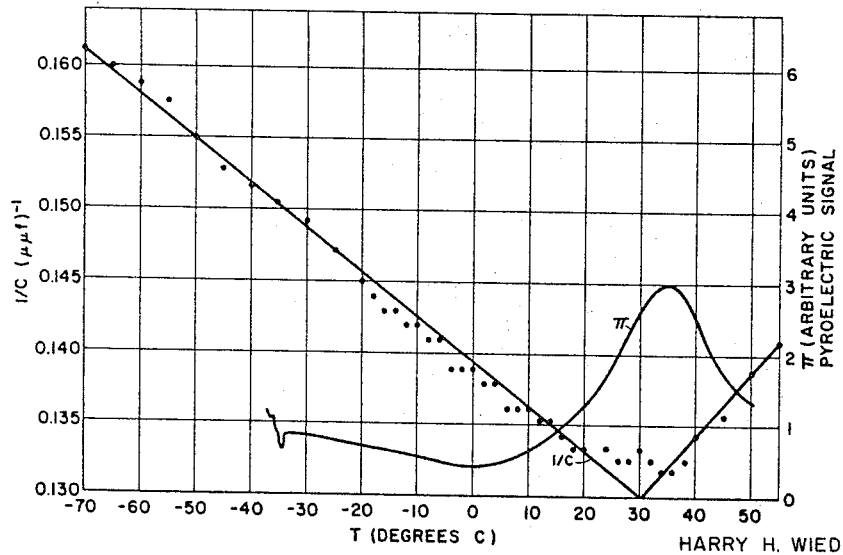
FIG. 3 shows characteristic curves for the strontium isomorph of colemanite.

In order to test the dielectric and pyroelectric properties pressed powder pellets were prepared in accordance with the description in the publication by Wieder, Clawson and Parkerson aforementioned. FIGURE 3 (1/C curve) shows that the strontium isomorph of colemanite obeys a Curie-Weiss relation since the capacitance which may be considered as proportional to the electrical susceptibility has the typical dependence of ferroelectrics in the vicinity of their Curie temperatures. The curie temperature of the strontium isomorph shown in FIG. 3 is +30° C. Subsequent measurements performed on other samples established the Curie temperature to be between +30° and +35° C. This is also supported by the pyroelectric data shown in FIG. 3 ($\pi$ curve) which illustrates the magnitude of the pyroelectric signal as a function of temperature obtained directly on an XY recorder. The experimental method for obtaining the pyroelectric response is also described in the publication by Wieder, Clawson and Parkerson.

The data presented here for the colemanite strontium isomorph represent a shift of the Curie temperature from −35° C. for the pure synthetic colemanite to +35° C. The advantages of the addition of strontium and its substitution in the crystal lattice of colemanite represent a method for controlling and tailoring the properties of this material for obtaining a peak response of a pyroeletcric detector at some predetermined temperature between +35° C. and −35° C. Also, the operation of ferroelectric memory elements from the strontium isomorph may be used at or near room temperature.

The strontium isomorph, Compound I $$(2SrO \cdot 3B_2O_3 \cdot 5H_2O)$$

of colemanite (100% replacement of calcium by strontium) can be synthesized by several reactions. The following related strontium borate hydrates may also be prepared as given in Table of Reactions:

Compound III ($SrO \cdot 3B_2O_3 \cdot 4H_2O$), Reaction No. 9
Compound IV ($SrO \cdot 3B_2O_3 \cdot 4H_2O$), Tunellite, Reaction No. 13
Compound V ($SrO \cdot B_2O_3 \cdot 4H_2O$), Reaction No. 15
Compound VI ($SrO \cdot B_2O_3 \cdot 4H_2O$), Reaction No. 11

Any one of these compounds is converted to Compound I ($2SrO \cdot 3B_2O_3 \cdot 5H_2O$) by the action of borax solution as described in Reactions 10, 12, 14 and 16. Compounds III and IV are dimorphous. Compounds V and VI are also dimorphous.

Compound I can also be prepared by the direct reaction of borax with a partially ionized strontium compound such as $Sr(IO_3)_2 \cdot H_2O$ (see Reaction 17). Direct reaction of borax with a highly ionized strontium compound such as $SrCl_2 \cdot 6H_2O$ or $Sr(NO_3)_2$ produces Compound I (see Reaction 18).

Obviously many modifications and variations of the present invention are possible in the light of the above teachings. It is therefore to be understood that within the scope of the appended claims the invention may be practiced otherwise than as specifically described.

What is claimed is:

1. The synthesis of synthetic colemanite with partial substitution of strontium for calcium for the purpose of controlling the Curie temperature of the product at desired values within the range of −35° C. to +35° C., by (a) preparing in the presence of a strontium ion impurity a higher hydrate from the calcium borate series consisting of $2CaO \cdot 3B_2O_3 \cdot 13H_2O$, synthetic $$2CaO \cdot 3B_2O_3 \cdot 9H_2O$$

and $2CaO \cdot 3B_2O_3 \cdot 7H_2O$ to provide a higher hydrate containing partially substituted strontium for clacium, the strontium ion impurity being selected from the group of $SrCl_2$, $Sr(NO_3)_2$, and $Sr(IO_3)_2 \cdot H_2O$, the amount of strontium ion impurity used being entirely dependent upon the desired Curie temperature of the product compound, (b) reacting one part by weight of at least one of said higher hydrates containing partially substituted strontium for calcium with approximately 100 parts by weight of approximately 1.7% borax solution at 65° C. for a period of approximately 35 days, (c) said reaction of said higher hydrates with a borax solution being seeded with at least 1 part by weight of −200 mesh synthetic colemanite to 10 parts by weight of said higher hydrate containing partially substituted strontium for calcium in the reaction mixture (d) filtering, washing and drying the reaction product of colemanite containing partial substitution of strontium for calcium and having a crystal lattice very similar to colemanite.

2. The synthesis as in claim 1 wherein a strontium ion impurity is also added to said reaction of said higher hydrates with a borax solution as a means for increasing the degree of strontium substitution for calcium in the final reaction product.

References Cited

Christ: The American Mineralogist, vol. 45, March–April 1960, pp. 334–340.

Hart et al.: Journal of Inorganic and Nuclear Chemistry, vol. 24, 1962, pp. 1057–1065.

Parkerson (A): U.S. Naval Ordnance Laboratory, Tech Memo No. 42–24, January 1959, pp. 1–8.

Parkerson (B): U.S. Naval Ordnance Laboratory, Tech Memo No. 42–31, June 1959, pp. 1–8.

OSCAR R. VERTIZ, *Primary Examiner.*

H. T. CARTER, *Assistant Examiner.*